United States Patent
Wong et al.

(10) Patent No.: US 6,654,746 B1
(45) Date of Patent: Nov. 25, 2003

(54) METHODS AND APPARATUSES FOR SINGLE-CONNECTION FILE SYNCHRONIZATION WORKGROUP FILE UPDATE

(75) Inventors: Danny Wong, Marina Del Rey, CA (US); Leo Stutzmann, Whitby (CA); Peter Dickinson, Huntington, NY (US)

(73) Assignee: Symantec Corporation, Cupertino, CA (US)

(*) Notice: Subject to any disclaimer, the term of this patent is extended or adjusted under 35 U.S.C. 154(b) by 0 days.

(21) Appl. No.: 09/304,295

(22) Filed: May 3, 1999

(51) Int. Cl.[7] .............................................. G06F 17/30
(52) U.S. Cl. ........................ 707/10; 707/203; 707/201; 709/203; 709/219
(58) Field of Search ................................ 345/330–331, 345/346, 329, 339, 328, 355, 333; 707/101, 515, 200–203; 709/204–205; 701/14

(56) References Cited

U.S. PATENT DOCUMENTS

| | | | |
|---|---|---|---|
| 5,008,853 A | * 4/1991 | Bly et al. | 345/331 |
| 5,694,596 A | 12/1997 | Campbell | 395/610 |
| 5,729,735 A | * 3/1998 | Meyering | 707/10 |
| 5,752,039 A | 5/1998 | Tanimura | 395/712 |
| 5,787,247 A | 7/1998 | Norin et al. | 395/200.5 |

(List continued on next page.)

FOREIGN PATENT DOCUMENTS

| | | | | |
|---|---|---|---|---|
| WO | WO 94/23377 A1 | 10/1994 | | G06F/15/00 |
| WO | WO 94/25923 A1 | 11/1994 | | G06F/15/21 |

OTHER PUBLICATIONS

Freed, Les. "Symantec Mobile Update," First Looks section of *PC Magazine Online*, Jun. 10, 1998. <URL:http://www.zdnet.com/pcmag/firstlooks/9806/f980610a.htm>.

"Keeping Road Warriors on Track," Mind Your Own Business, Jun. 1998, Market Place Publishing United Kingdom, vol. 21, No. 6, p. 49.

Schneier, Bruce. "One–Way Hash Functions," *Dr. Dobb's Journal*, Sep. 1991, vol. 16, No. 9, pp. 148–151.

Kris Coppieters, "A Cross–Platform Binary Diff", pp. 1–7, Dr. Dobb's Journal, May 1995.

Darrell Diem, "Wireless Data and Minimum Airtime Software", pp. 1–14, Dr. Dobb's Journal, Dec. 1993.

*Primary Examiner*—Jean R. Homere
*Assistant Examiner*—Mohammad Ali
(74) *Attorney, Agent, or Firm*—Fliesler Dubb Meyer & Lovejoy, LLP

(57) ABSTRACT

A server computer updates client computers' copies of subscription files stored on a network. The server computer retrieves a database record from a subscription database. The database record includes at least client computer and subscription file information. The server computer checks the subscription file stored on the network for any changes which may have occurred to the file since the previous checking of the subscription file preferably by comparing the last save time stamp to a time stamp on the subscription file stored on the network. If changes have occurred, the server computer creates an update file for the client computer and transmits the update file to the client computer, preferably by electronic mail. Each database record may further contain a check interval indicating the periodicity of the checking of the subscription file for changes. The database record may further contain a time last checked field which is updated each time the subscription file is checked for changes. The subscription file is checked for changes only when the current time is equal to or greater than the time last checked plus the check interval. The subscription database is built by the server computer. The server computer receives subscription information from each client computer which includes at least the client computer and subscription file information, and this information is stored. The subscription database is stored either on the server computer's hard disk or on the network.

9 Claims, 7 Drawing Sheets

U.S. PATENT DOCUMENTS

| | | | |
|---|---|---|---|
| 5,794,258 A | * 8/1998 | Ishikawa et al. | 707/502 |
| 5,819,274 A | * 10/1998 | Jackson, Jr. | 707/10 |
| 5,835,911 A | 11/1998 | Nakagawa et al. | 707/203 |
| 5,864,837 A | 1/1999 | Maimone | 707/1 |
| 5,890,164 A | 3/1999 | Nielsen | 707/201 |
| 5,913,032 A | * 6/1999 | Schwartz et al. | 709/213 |
| 6,012,087 A | 1/2000 | Freivald et al. | 709/218 |
| 6,014,135 A | * 1/2000 | Farnandes | 345/331 |
| 6,058,428 A | 5/2000 | Wang et al. | 709/232 |
| 6,073,007 A | * 6/2000 | Doyle | 345/331 |
| 6,101,507 A | 8/2000 | Cane et al. | 707/204 |
| 6,151,708 A | 11/2000 | Pedrizetti et al. | 717/11 |
| 6,161,125 A | 12/2000 | Traversat et al. | 709/203 |

* cited by examiner

| | USER | E-MAIL ADDRESS | SUBSCRIPTION FILE PATH NAME | CHECK INTERVAL | LAST CHECKED | LAST SAVE TIME STAMP |
|---|---|---|---|---|---|---|
| 601 | USER1 | ADDR1 | FILE1 | 24 hrs. | TIME1 | SAVET1 |
| 602 | USER1 | ADDR1 | FILE2 | 7 days | TIME2 | SAVET2 |
| 603 | USER1 | ADDR1 | FILE3 | 1 hour | TIME3 | SAVET3 |
| 604 | USER1 | ADDR1 | FILE4 | 24 hrs. | TIME4 | SAVET4 |
| 605 | USER2 | ADDR2 | FILE1 | 1 hour | TIME5 | SAVET5 |
| 606 | USER3 | ADDR3 | FILE3 | 7 days | TIME6 | SAVET6 |
| 607 | USER3 | ADDR3 | FILE5 | 30 mins. | TIME7 | SAVET7 |

METHODS AND APPARATUSES FOR SINGLE-CONNECTION FILE SYNCHRONIZATION WORKGROUP FILE UPDATE

CROSS-REFERENCE TO RELATED APPLICATION

This Application is related to the following Application, which is filed of even date herewith, and is incorporated herein by reference:

"Methods and Apparatuses for Single Connection File Synchronization and Workgroup File Update", U.S. patent application Ser. No. 09/303,958.

BACKGROUND OF THE INVENTION

1. Field of the Invention

The present invention relates to the field of personal computers which access files on network drives and which utilize electronic mail systems. Specifically, the present invention involves the synchronization of the local copies of files on multiple mobile users' client computer hard disks to the current versions of the files on a network drive using only a single connection to the network drive.

2. Discussion of the Related Art

As more and more business information moves from analog to digital formats, the relatively newfound ability to create, amend, and revise information spontaneously and frequently has brought with it challenges for corporate users. Revenue results can now be easily aggregated and updated in near real time, sales presentations can be amended regularly, and changes made to business documents. However, causing these changes to effectively trickle down through the organization without causing a digital flood is a challenge.

Companies have responded to the threat by carefully creating structures for organizing, storing, and sharing these electronic files. Organizations have moved from file servers to intranet sites to combinations of both to meet the need of the corporate user. While these structures are clearly effective means of storing, sharing, and organizing information, they do not address the fact that users have very individual information needs. They also do not resolve the obstacle users face who do not have the time to spend looking for changes. An effective paradigm for addressing the problem of individual needs and delivering changes to documents can be found in the emerging category of "Push Technology."

As its simplest definition, push is the process of automatically delivering user-requested information electronically. It is not an application, but merely a function or feature in a product. There are clear distinctions between the three different categories of push-based application: content, software, and document.

Content push is the first mover. Conventional products focus on delivering breaking news and information to user desktops automatically. Instead of the user constantly surfing multiple Web sites for stock quotes, news, weather, etc., conventional products aggregate and broadcast information automatically according to individual user preferences. Many companies incorporate "push" functionality into their products.

Following acceptance by hundreds of thousands of early adopters, many push-based applications started the move into the corporate world. For IS Managers, "push-based technologies" were seen as an uncontrollable avenue for terabytes of graphics and HTML to come through the corporate firewall and network, filling local hard drives. Microsoft and Netscape entered the fray with their own "push" clients — IE 4.0 Active Desktop and Communicator's Netcaster, respectively. Rather than spurring the growth of content delivery, however, the effect of the push entries has been to call into question the value of delivering Web content to user hard drives. The value is questioned not only in terms of relevance, but also its effects and load on corporate networks. The automated information flow becomes a flood through the Internet gate-ways of corporations threatening the stability and reliability of the network infrastructure itself.

Within the corporate world, the future of content push remains in limbo. Uncertainty over standards and overall value have caused the market to trip on the initial momentum and slow to a crawl. However, what is questioned here is not the value of automating delivery or "push," but rather the value of what is being pushed.

Software Push is another important objective. Microsoft and Marimba, among others, have recognized the importance and potential of "Electronic Software Distribution" (ESL) or "software push" as a way of addressing the need to seamlessly deliver software updates across the network with the goal of directly impacting the total cost of ownership. The requirements for software distribution are dramatically different from content distribution. For one, the "content" in software delivery is, by its very nature, deemed critical. To reduce the impact of supporting multiple versions of products across the corporate network, near-simultaneous deployment is imperative. Companies that do not use some form of software push technologies require dedicated individuals to make the rounds updating software by reinstalling or applying patches for each personal computer and laptop.

Rather than aggregating and displaying information, software push transparently delivers one specific piece of information and applies it to user systems or applications. Files tend to be very large and the delivery of these files must be well-managed. Incremental downloading becomes important to reduce frustration and bandwidth associated with broken and lost connections. Management of software updating also needs to be centralized and MIS-controlled. In addition, the primary value of the application is to IS personnel and only indirectly to for the end-users.

A good example of software push is Marimba's Castanet, which allows Java applications to be distributed and updated seamlessly and automatically without user intervention. This same approach to Java programming can be, and is being, applied to C-language programs as well. The case of content push vs. software push makes it clear that the importance lies in the distinction between the data being delivered — and not the delivery mechanism itself.

The Next Phase is Electronic Document Delivery. The final frontier in digital push is "electronic document delivery" or EDD. It deals with delivering changes or "updates" to the same physical files (like software push), but the files themselves are highly personalized (like content push). Different from content push, these files exist in the form of sales presentations (PowerPoint), spreadsheets (Excel and Lotus 1,2,3), and reports and plans (Word or WordPerfect). These are the types of documents for which companies currently invest millions of dollars in file servers and intranet technologies in order to share among respective workgroups. The important distinction here between content and document push is the fact that EDD delivers data that currently exists in its native format within corporations and whose value is clearly understood by the company, MIS, and the end-user. With the recognized features, the willingness to invest in infrastructure is more likely.

Within conventional environments, users have access to files and can download or copy them on-demand, whenever they are aware that the network file document changes. File servers and intranet servers act as document repositories waiting passively to be accessed. The reality is that these files change erratically and the user can never really know when a file has changed. As a result, those who need to have the most current documents are required to perform hit-and-miss network browsing and checking which is time-consuming, unproductive, and frustrating. Even if the changes are scheduled, the user is still required to manually access, retrieve and manage those changes.

For mobile users, the problem of knowing about and accessing changes to network-based files is compounded by infrequent access to the corporate network. In addition, when remote from the office, users need to establish connections to the network via dial-up networking technologies, then search and browse the network over an often slow, unreliable connection. The productivity losses and frustrations are simply multiplied. The demands on network modem resources and network bandwidth is compounded by multiple mobile users all dialing in to attempt to retrieve the current versions of the files that they are concerned with. Many mobile users are unable to connect to the appropriate network drives for all of their files depending upon their location, or are unable to maintain a connection for long enough to download the files with which they are concerned.

As is apparent from the above discussion, a need exists for an efficient and effective mechanism for allowing, multiple mobile computers to receive copies of the current versions of network files on their respect client computers.

SUMMARY OF THE INVENTION

Conventionally, those who need to have the most current versions of computer files are required to perform hit-and-miss network browsing and checking which is time-consuming, unproductive, and frustrating. An object of the present invention is to provide a mechanism by which multiple users can be automatically provided with current versions of the files to which they subscribe without each user connecting to the network. Another object of the present invention is allow users to select their subscription files to be monitored by the server computer. According to the present invention, a server computer with a single connection to the network monitors multiple users' network files and folders stored on the network for changes and then sends the multiple users email notifications and updates when monitored items change.

According to the present invention, a server computer updates client computers' copies of subscription files stored on a network. Thus, the need for multiple connections to the network by each of the client computers is eliminated. The server computer retrieves a database record from a subscription database. The database record includes at least client computer and subscription file information. The client computer information preferably includes the user's electronic mail address. The subscription file information indicates the network file for which the user is interested in receiving updates. The server computer checks the subscription file stored on the network for any changes which may have occurred to the file since the previous checking of the subscription file preferably by comparing the last save time stamp to a time stamp on the subscription file stored on the network. Additionally according to the preferred embodiment of the present invention, the server computer compares a current CRC of the subscription file to a previous CRC of the subscription file, and compares a current file size of the subscription file to a previous file size of the subscription file. Alternatively, a previous version subscription file signature is compared to a current version subscription file signature to determine if the subscription file has changed. If changes have occurred, the server computer creates an update file for the client computer and transmits the update file to the client computer, preferably by electronic mail.

According to another aspect of the present invention, each database record may further contain a check interval indicating the periodicity of the checking of the subscription file for changes. The check interval is preferably determined by the user, so that critical subscription files are updated frequently, while less important subscription files are monitored less frequently. The database record may further contain a time last checked field which is updated each time the subscription file is checked for changes. The subscription file is checked for changes only when the current time is equal to or greater than the time last checked plus the check interval.

According to yet another aspect of the present invention, the subscription database is built by the server computer. The server computer receives subscription information from each client computer which includes at least the client computer and subscription file information, and this information is stored. The subscription information may alternatively further include the check interval. Although multiple users may subscribe to the same subscription files, the different multiple users may specify different check intervals, thus the same subscription file may be accessed by the server computer at various times to accommodate the updating of the multiple users. The subscription database is stored either on the server computer's hard disk or on the network.

These and other features of the present invention are apparent from the Drawings which are described in narrative form in the Detailed Description of the Invention.

BRIEF DESCRIPTION OF THE DRAWINGS

FIG. 6 illustrates a subscription database maintained by a server computer according to the present invention.

Figure 1:
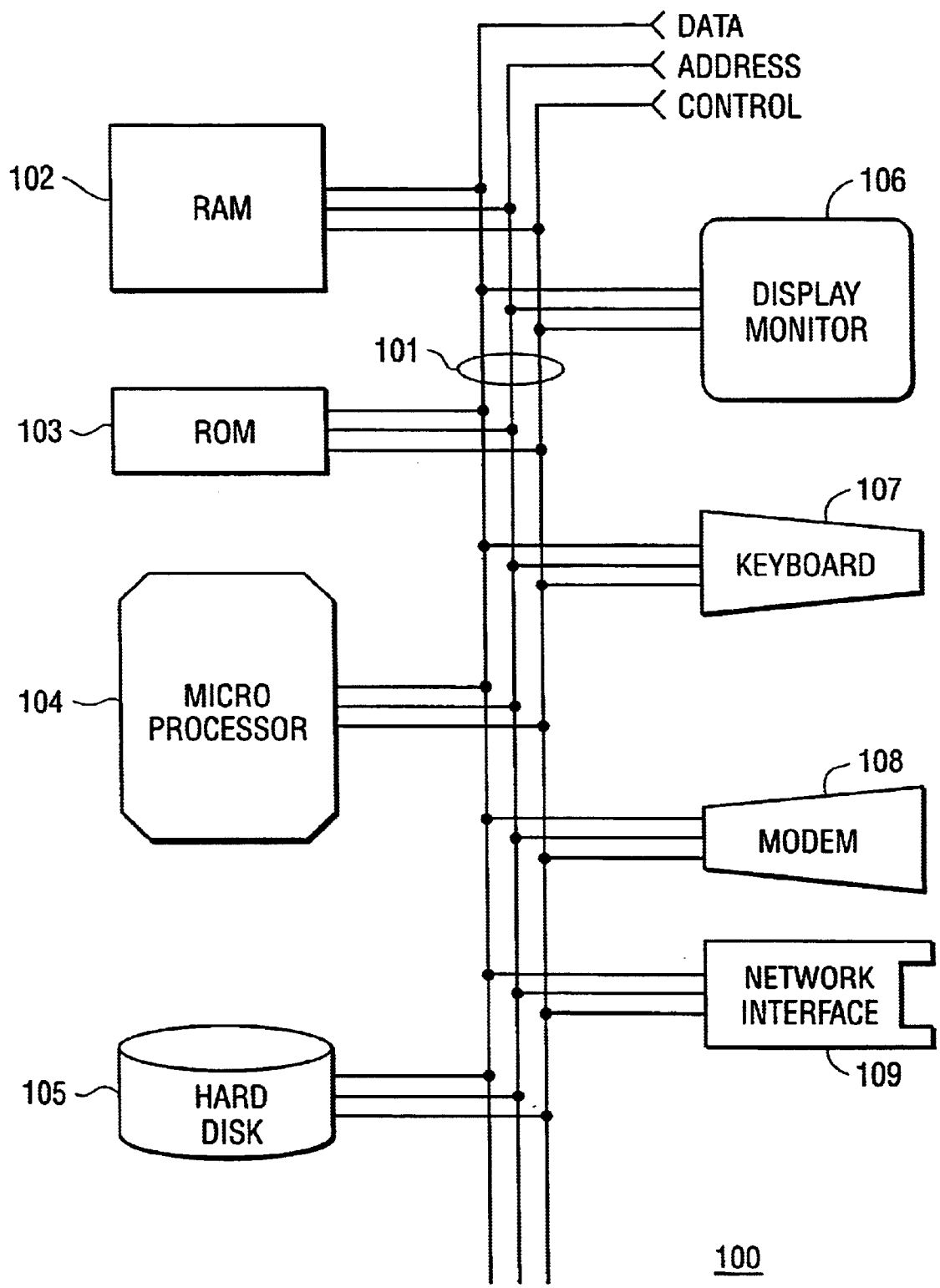
FIG. 1 illustrates a general purpose computer architecture suitable for implementing the methods according to the present invention.

The Figures are more thoroughly described in narrative form in the Detailed Description of the Invention.

DETAILED DESCRIPTION OF THE INVENTION

Although intranets are growing in popularity, they are not likely to replace file servers any time soon. File servers are one of the primary ways to store and share data on corporate networks due to their sheer simplicity for posting and retrieving files. Users have grown accustomed to working with network drives, even to the extent where in which data is actually stored directly on the network, rather than on their own hard drives. The intranet, on the other hand, requires that documents be "posted" or "uploaded" to a web server, usually by a select group of individuals. Thus, making documents available to others goes from the simple task of copying a file onto a network directory to submitting a file to be processed by others. On the recipient end, it involves activating a browser, going to the appropriate URL or IP address, finding the document on a page and downloading it (as opposed to a simple drag-and-drop file copy to the hard drive).

In spite of the varying degrees of complexity, there is value in both methods of file sharing. Since virtually all Intranet documents are converted forms of some other type of document file, the most current information is often found in native files on the LAN, rather than information posted to a web page. In addition, not all changing files used in the day-to-day life of the mobile professional are found on the intranet, whereas all intranet-based files can typically be found on the network. Thus, browser-access alone is not always adequate to serve the needs of document delivery.

According to research, the most popular method of connecting to the corporate network is through electronic mail. Not surprisingly, electronic mail is treated as a mission critical application. For remote or mobile professionals, it is the one connection they do make to the network on a recurrent basis. This familiar, reliable system is well-suited for electronic document delivery (EDD). So well-suited, in fact, that many departments and users currently rely on electronic mail as a primary way to send documents to other users. Even with existing network and Intranet infrastructures, a typical response to the suggestion, "It's now posted on the site, you can download it" is "I know, but could you send it to me by email? It's easier". The simplicity of using electronic mail as a single connection to a wide variety of information sources is very compelling to both users and corporations, with the caveat that the files being sent must not impede the network, the mail server, or the end-user's experience. This means, for truly effective document push, file size has to be addressed, first and foremost.

Electronic Document Delivery involves more than just the physical process of sending out documents automatically. The indiscriminate sending or downloading of full-size files places a heavy burden on network bandwidth, IS, and the mobile professional. Intelligence needs to be built into the entire process of delivery to be truly effective and valuable to both MIS and users.

For truly effective Document Delivery, server-based intelligence is required. It is needed for detecting and sending changed files, but also as well as for detecting what changes have been made and packaging only those changes as efficiently as possible. If only 50 cells of 5000 have changed in a spread-sheet, it does not make sense to send the entire file again. If only a single slide in a 50-slide presentation changes, it does not make sense to re-send the entire 2 MB file.

Symantec Mobile Update™ (Symantec Mobile Update is a trademark of Symantec Corporation and its subsidiaries) according to the present invention, through a combination of server-based "delta technology" and client-based "update agent technology", adds "intelligence" to document delivery by automatically offering a seamless way of receiving changes to corporate documents. The next section discusses the technology used by Mobile Update according to the present invention to bring "intelligence" to document delivery.

Mobile Update according to the present invention is a program that monitors files and folders stored on your network for changes and then sends the user electronic mail notifications and updates when monitored items change. Designed for networked organizations, Mobile Update simplifies the process of keeping important files up to date, especially for mobile professionals and telecommuters. Because corporations store and maintain important documents (such as telephone lists, sales reports, and pricing sheets) on network drives, employees regularly need to check that they have the most current versions of those documents. Mobile Update automates the process of monitoring important network files and updating local copies of those files when they change.

Like an executive assistant, the Mobile Update server program monitors the network documents that are important to you and notifies you when they change. Using the Mobile Update client program, you can select which files you want to monitor, how often you want the Mobile Update server to check for changes, and whether you want to receive a notification email or the actual file update by email when files change.

Mobile Update according to the present invention is designed primarily to serve the mobile professional as the target user, who relies on copies of the most up-to-date documents to be effective, but who is not always connected to the network to access changes. In addition, the mobile user is challenged with both slow connection speeds to the network (typically 28.8 Kb/sec modem), as well as the hassles of getting and staying connected. The Mobile Update solution according to the present invention is comprised of a server portion (for tracking files on the network and processing changes) and a client portion (for managing document "subscriptions" and for incorporating changes into existing documents).

A Mobile Update system requires two types of Mobile Update installations: Mobile Update server and Mobile Update client. One or more users install the Mobile Update client program on their Windows 95 or Windows NT computers. The server functions as the "control center" for the Mobile Update system. Users subscribe to network files to which they have network access. The server then keeps track of the files subscribed to in a database, monitors the files for changes, and sends users notifications or file updates via email.

The Mobile Update Client portion is used to create and manage subscriptions to network documents. The process of selecting files to be monitored is referred to as "subscribing". Users browse to the network directory where the desired files are stored and select either individual files or folders (excluding sub-folders). Once selected, the user then determines the polling or monitoring interval for the server to check for changes and also what to do when changes occur, i.e., package and send file changes or simple notification. Once the subscription is set up, the information is passed to the server and stored in its database.

The Mobile Update Server according to the present invention acts as an "electronic assistant" on the network, tracking documents for changes. It polls files or subfolders at either user-defined intervals for any changes to date, time stamps, and also for changes to the CRC of the file or the file size. When it detects a change, it checks the integrity of the file, then decides whether it needs to deliver the actual changes or simply notify send notice of a file change. When checking folders, it checks for the existence of any new files within the folder.

FIG. 1 illustrates a general purpose computer system 100 suitable for implementing the methods according to the present invention. The general purpose computer system 100 includes at least a microprocessor 104. The general purpose computer may also include random access memory 102, ROM memory 103, a keyboard 107, and a modem 108. All of the elements of the general purpose computer 100 are optionally tied together by a common bus 101 for transporting data between the various elements. The bus 101 typically includes data, address, and control signals. Although the general purpose computer 100 illustrated in FIG. 1 includes a single data bus 101 which ties together all of the elements of the general purpose computer 100, there is no requirement that there be a single communication bus 101 which connects the various elements of the general purpose computer 100. For example, the microprocessor 104, RAM 102, and ROM 103, are alternatively tied together with a data bus while the hard disk 105, modem 108, keyboard 107, display monitor 106, and network interface 109 are connected together with a second data bus (not shown). In this case, the first data bus 101 and the second data bus (not shown) are linked by a bidirectional bus interface (not shown). Alternatively, some of the elements, such as the microprocessor 102 and RAM 102 are connected to both the first data bus 101 and the second data bus (not shown), and communication between the first and second data bus occurs through the microprocessor 102 and RAM 102. The network interface 109 provides communication capability to a local area network LAN using an ethernet connection, for example. The modem 108 allows the computer 100 to communicate through the telephone system. The methods of the present invention are executable on any general purpose computer system such as the 100 illustrated in FIG. 1, but there is clearly no limitation that this computer system is the only one which can execute the methods of the present invention.

Figure 2:
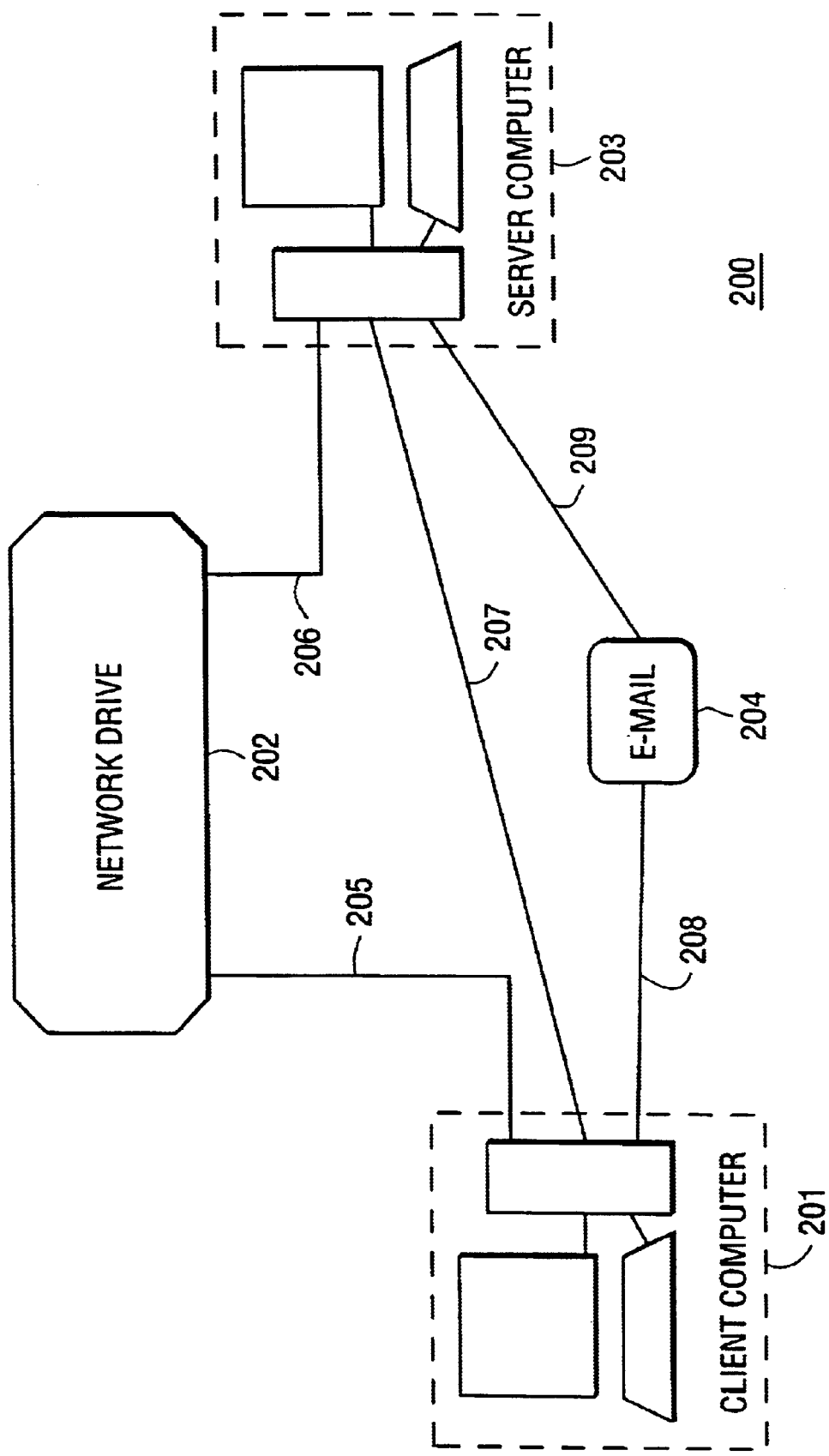
FIG. 2 illustrates a network of computers suitable for implementing the methods according to the present invention.

FIG. 2 illustrates a network of computers suitable for implementing the methods according to the present invention. A client computer 201 is connected to a network drive 202 through link 205. A server computer 203 is connected to a network drive 202 through a link 206. The client computer 201 and server computer 203 are logically connected by a link 207 for communication between them. The server computer 203 is logically connected to an electronic mail facility 204 through link 209. Client computer 201 is logically connected to the electronic mail facility 204 through link 208. The logical connections 207, 208, and 209 are not necessarily physical connections. For example, the client computer 201 is alternatively a remote computer which periodically connects to the network drive 202 through a modem. In this event, the modem (not shown) provides the physical connection through which the logical connections 205, 207, and 208 are implemented.

FIG. 2 illustrates the interaction between client, server, and network according to the present invention. The user browses the network through link 205 from his client computer 201 to determine the files to which he wishes to subscribe. The client computer 201 sends the subscription information to the server computer 203 through logical link 207. The server computer 203 polls the network 202 through link 206 for changes to the subscription files. The server sends update files to the client computer 201 through the email facility 204 through logical link 209. The client computer receives update files through the logical link 208.

Figure 3:
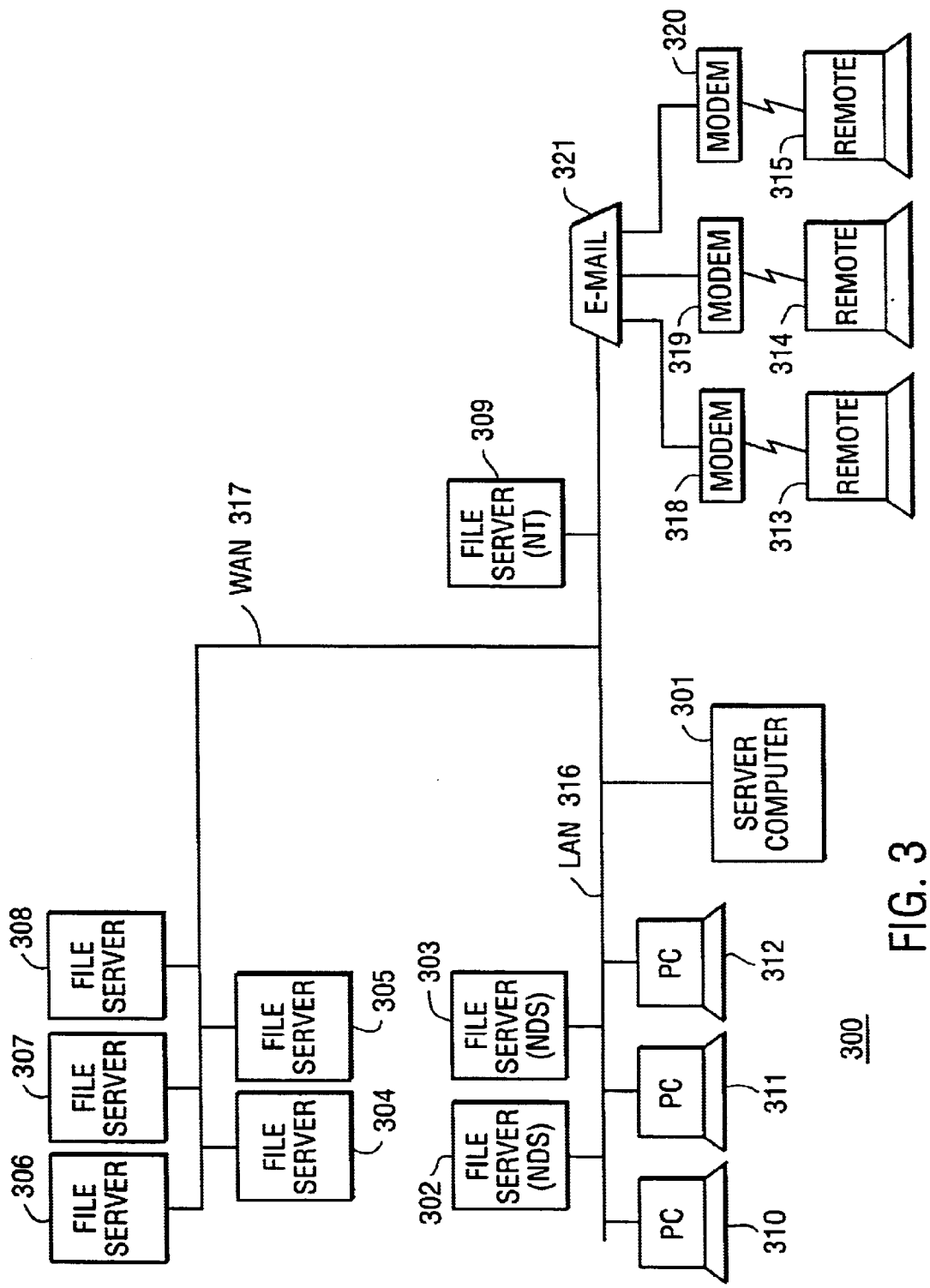
FIG. 3 illustrates a large and diverse network of computers suitable for implementing the methods according to the present invention.

FIG. 3 illustrates a large and diverse network of computers suitable for implementing the methods according to the present invention. Specifically, the server computer 301 accesses subscription files stored on any of the file servers 302 through 309. The personal computers 310 through 312 are connected to local area network 316. Remote personal computers 313 through 315 dial in to modems 318 through 320 respectively in order to receive their electronic mail from the electronic mail facility 321 and receive update files corresponding to the subscription files to which they subscribe.

FIG. 3 illustrates a sample deployment for Mobile Update according to the present invention. The clients runs in both on-line mode and off-line mode. The client runs in on-line mode when it is on the network where it can communicate directly with the server's database. The client runs in off-line mode when the user is mobile and not connected to the network.

Mobile Update users can monitor any network file or folder to which they have network access by "subscribing" to that file or folder. The Subscription wizard, available in the Mobile Update client program, helps users select the item they want to monitor, specify how often they want the item checked for changes, indicate what type of email notification they want to receive, and specify where they want to save a local copy of the item on their computer. When users subscribe to an item, three things happen. First, Mobile Update copies the current version of the item to the user's computer. This becomes the base version is updated in the future. Second, Mobile Update registers the subscription item in the Mobile Update subscription database. The subscription database resides on the server computer and contains a list of all Mobile Update users, their subscriptions, and all associated subscription files. Third, the Mobile Update server begins monitoring the item according to the monitoring options specified by the subscribing user.

Figure 4:
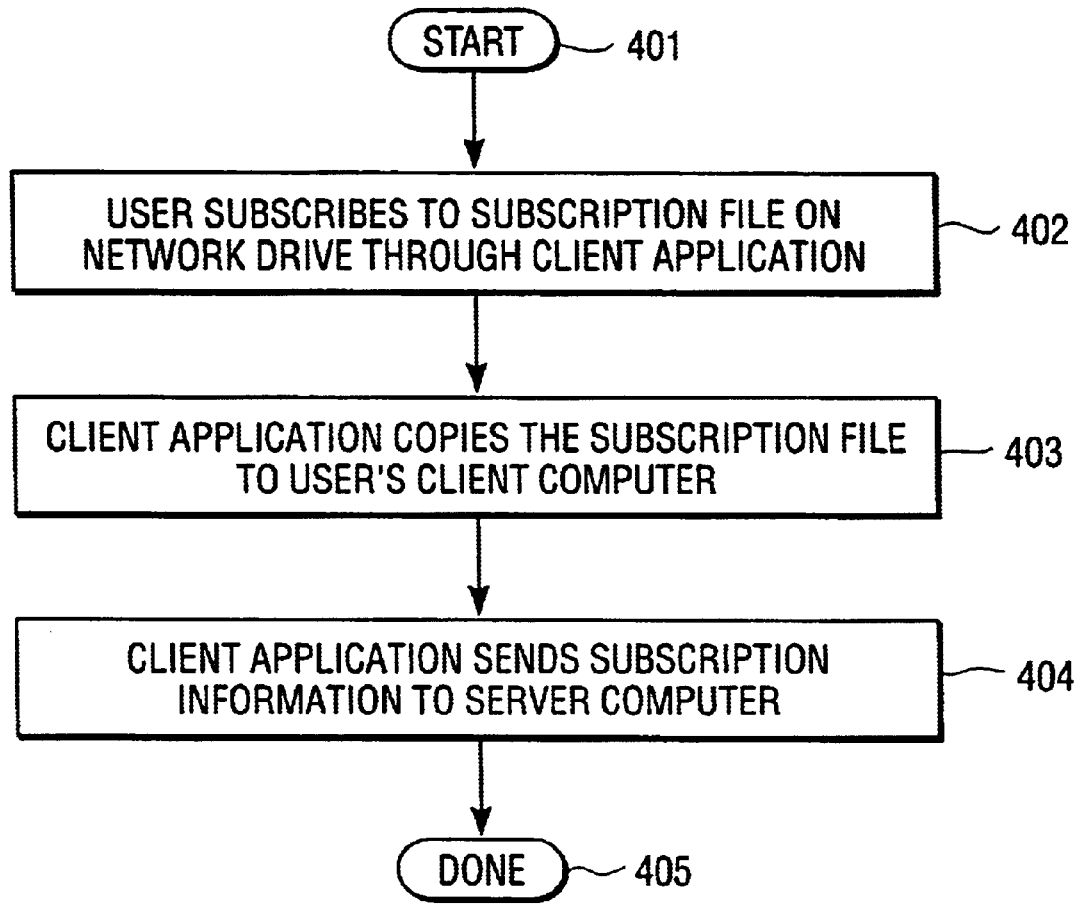
FIG. 4 illustrates a method for a user to subscribe to a subscription file according to the present invention.

FIG. 4 illustrates a method for a user to subscribe to a subscription file according to the present invention. The method starts at step 401. At step 402, the user subscribes to the subscription file on the network drive through the client application. At step 403, the client application copies the subscription file to the user's client computer from the network. At step 404, the client application sends the subscription information to the server computer, and the client application has finished the subscription method at step 405.

The Subscription wizard helps users select the files or folders they want to monitor. Users can change monitoring and notification options for individual subscriptions at any time, or they can set default options that apply to all new subscriptions.

If the user is connected to their network when they modify subscription options (either through the LAN or by dialing in using a remote access program such as Microsoft RAS), Mobile Update modifies the subscription database immediately. If users are not connected to their network, Mobile Update automatically sends an offline modification request email to the Mobile Update server with the change details. When the server receives the email, it automatically processes the changes and updates the subscription database. The next time the user starts the Mobile Update client program and logs on to the Mobile Update server, the changes appear in their Mobile Update subscription list.

As a user, you can invite another Mobile Update user to monitor a file or folder in your subscription list. For example, you may be monitoring a weekly sales report stored on the network that you would like a co-worker to monitor for changes as well. Instead of asking the Mobile Update user to manually subscribe to the file, you can automate the process by sending them a monitoring invitation. You can send invitations to one Mobile Update user at a time or to a list of Mobile Update users. When users send invitations, Mobile Update sends the invitee a special email with the invitation attached as an INV file. If the invitee has the Mobile Update client program installed on their computer and has network access to the monitored item, the invitee can accept the invitation by running the .INV file attached to the email. When the invitee accepts the invitation, Mobile Update copies the current version of the file to the invitee's hard drive and adds the subscription to the invitee's Mobile Update subscription list. If a user is not connected to their network when they accept an invitation, this transaction is routed by email through the Mobile Update server, which processes the transaction as an offline request and then sends the appropriate files or information to the user via email.

Figure 5:
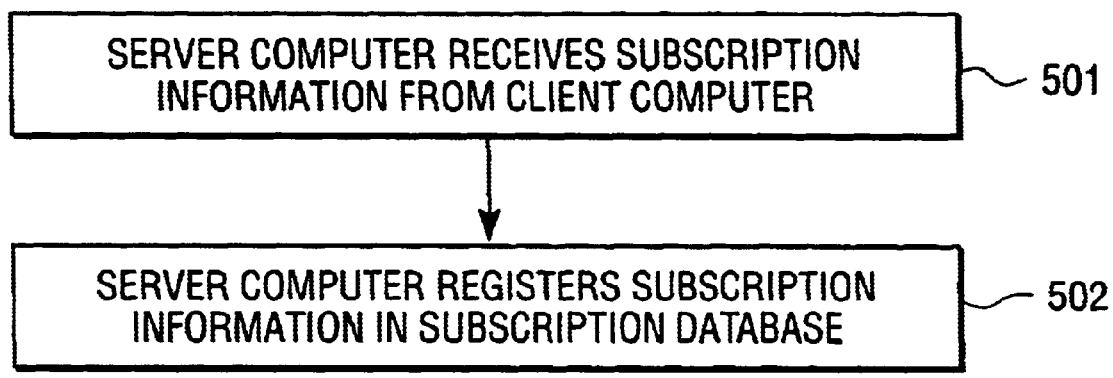
FIG. 5 illustrates a method for a server computer to build a subscription database according to the present invention.

FIG. 5 illustrates a method for a server computer to build a subscription database according to the present invention. The server computer receives the subscription information from the client computer at step 501. At step 502, the server computer registers the subscription information in the subscription database.

FIG. 6 illustrates a subscription database maintained by a server computer according to the present invention. The subscription database depicted in FIG. 6 is a logical database. Each unique piece of information is stored only once, and pointers to the unique pieces of information are stored in each of the physical database records. For example, the user USER1's e-mail address ADDR1 is actually only stored in one place, and the database records pertaining to the subscription files for USER1 reference the address ADDR1 by storing a pointer to the ADDR1. This avoids the redundancy of multiply storing the same information. The subscription database 600 includes seven database records 601 through 607. The subscription database 600 includes the subscription records pertaining to three users USER1, USER2, and USER3. USER1 has e-mail address ADDR1 and subscribes to four subscription files FILE1 through FILE4. The check intervals for the subscription files FILE1 and FILE4 for USER1 is 24 hours, as shown in database records 601 and 604. USER1 has specified that FILE2 be checked weekly. USER1 has specified that FILE3 be checked hourly. TIME1 through TIME4 represent the times that the server computer last checked FILE1 through FILE4 for USER1 for changes. SAVET1 through SAVET4 represent the last save time stamp corresponding to each of FILE1 through FILE4 which was found by the server computer the last time that the subscription files FILE1 through FILE4 were checked for changes for USER1.

Database record 605 shows that USER2 having e-mail address ADDR2 subscribes to FILE1 with an hourly check interval. TIME5 is the time last checked of FILE1 for USER1. SAVET5 is the last save time stamp for FILE1 which was found by the server computer the last time that the server computer checked FILE1 for USER2 for changes. Because the check intervals pertaining to database records 601 for USER1 and 605 for USER2 are different, the last checked times TIME1 and TIME5 are different from each other, and the last save time stamp SAVET1 and SAVET5 are different from each other. USER3 having e-mail address ADDR3 subscribes to subscription files FILE3 and FILE5, as shown in database records 606 and 607. FILE3 is checked by the server computer for USER3 weekly for changes, and FILE5 is checked for USER3 every 30 minutes for changes.

The Mobile Update server monitors the subscription files and folders in the subscription database according to the monitoring options specified by the user. The Mobile Update server is a Windows NT service that runs in the background whenever Windows NT is running on the server computer and whenever monitoring is scheduled. The service does not require the Mobile Update administrator to be logged on to the server computer to monitor files and folders for changes.

When the server detects changes to monitored items, it sends a Notification email to the Mobile Update user from the Mobile Update server email account. Depending on the notification option selected by the user, this email may contain a notification message or the actual update to the file.

When a file or folder associated with a subscription changes, the Mobile Update server sends a special email to the appropriate user. Depending on the notification option selected by the user, the Mobile Update server sends either a "Notification" email or a "File Update" email. The Notification email contains the name of the changed file. Users can update their local copy of the file using the Re-Sync feature. The File Update email includes a compressed .MSP file attachment containing the changes to the monitored file it does not include the entire file. Because Mobile Update compresses the changes, the .MSP file is a fraction of the original file in size. Users can quickly update their local copy of the file by running the .MSP file attachment. This automatically patches the local version of the file (the one that was copied during the subscription process).

When a monitored file or folder changes, the Mobile Update server sends the user a special email (either a Notification email or a File Update email). If a File Update email is lost or if the local copy of the file is corrupt or lost, users can request that the server send them the latest version of the file using the Re-Sync feature. This feature sends a re-synchronization request to the Mobile Update server. When the Mobile Update server receives the request, it sends the user an Re-Synchronization email containing the entire file as a compressed .MSP file attachment. To overwrite the existing version of the file (if it exists), users simply run the .MSP file attachment.

Figure 7:
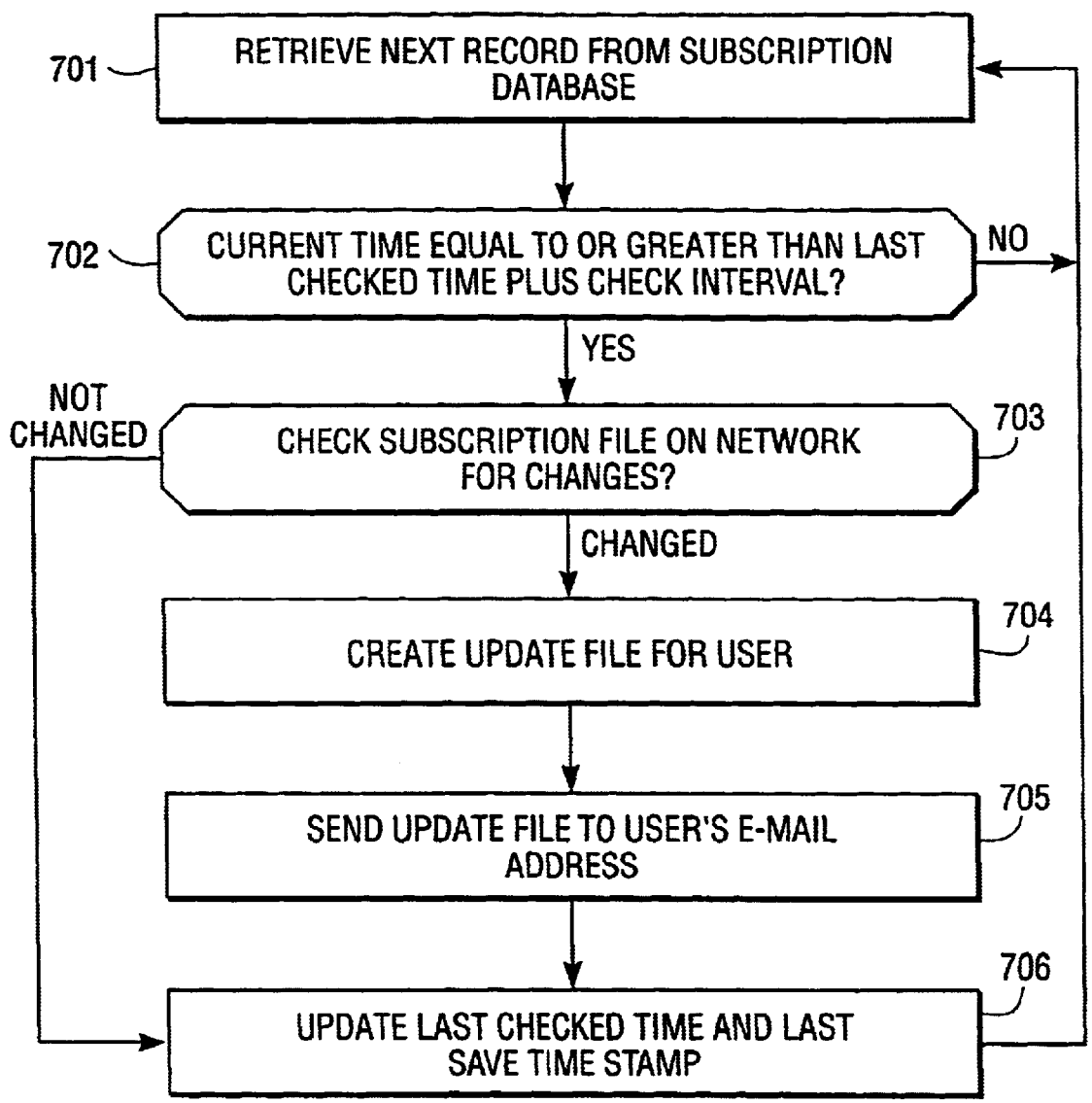
FIG. 7 illustrates a method for a server computer to update multiple mobile users' local copies of their subscription files using a single connection to the network according to the present invention.

FIG. 7 illustrates a method 700 for a server computer to update multiple mobile users' local copies of their subscription files using a single connection to the network according to the present invention. At step 701, the next record is retrieved from the subscription database 600 by the server computer 301. At step 702, the server computer determines whether the current time is equal to or greater than the last checked time plus the checked interval. In other words, it is determined whether or not the check interval has elapsed since the last check of the subscription file for the user specified in the record. If the checked interval has not elapsed since the last check of the subscription file for the user specified in the database record, the method returns to step 701 and retrieves the next record from the subscription database.

On the other hand, if the check interval has elapsed, the method continues to step 703, where the server computer 301 checks the subscription file on the network 202 for changes. Step 703 may be performed by comparing the last save time stamp in the database record to the current time stamp found associated with the subscription file on the network 202. If the time stamp found associated with the subscription file on the network 202 is later than the last save time stamp in the database record, then it is determined that the subscription file has changed since it was last checked by the server computer 301 for the user specified in the database record.

Alternatively, the determination performed by the server computer 301 at step 703 as to whether or not the subscription file has changed since the check of the subscription file for the user specified in the database record may be performed by maintaining a small signature of the previous version of the subscription file in the subscription database instead of the last save time stamp. For example, a CRC code, or digital signature computed using MD5 or the like is computed and stored in the database record. The signature for the current version of the subscription file is computed and compared to the signature stored in the subscription database in this alternative implementation of step 703.

If step 703 determines that the subscription file has changed, then an update file is created at step 704 for the user's client computer. The update file is mailed to the user's e-mail address found in the database record at step 705. The last checked time and last save time stamp are updated at step 706, and the method continues with the next database record at step 701. If step 703 determines that the subscription file has not changed, then the method jumps to step 706, where the last checked time is updated in the database record. In this event, although the last save time stamp (or alternatively subscription file signature) is stored into the database record at step 706, this value has not changed because the subscription file has not changed.

In the off-line mode according to the present invention, the user communicates with the server through email messaging. If changes are made to the properties of a subscription, such as a change in polling frequency or a re-sync request is made, the Mobile Update client automatically generates an email message to the server which is then placed in the outbox of the user's mail client. These messages are then sent when the user logs on to check or send e-mail. The messages are then received by the server's mail client and parsed and processed accordingly. The Mobile Update Server according to the present invention can access virtually any WAN-based server, providing it has the necessary network access rights, as illustrated in FIG. 3.

Symantec's Delta Technology according to the present invention has been optimized to detect and process changes quickly and efficiently, while concurrently maintaining the integrity of the file. When a user first "subscribes" to a file, the server takes a "digital snapshot" that forms the basis for determining changes made to the file in the future. The server reads the file from the network and determines the most efficient "delimiter" or "dividing point" to break the file into segments. A digital 'snapshot' is comprised of a series of segments which define the overall contents and structure of a file. A file can be segmented into hundreds, if not thousands, of segments depending on the file size and type.

Once a delta or Update File has been generated, the server creates an email message and sends the Update File as a simple binary attachment to the user. The user then receives updates through the user's standard email client.

For mobile professionals, this means making one connection to the network to receive all messages and document updates. It also means that the size of the attachment is a fraction of the full file, containing only the changes to be applied. In other words, the user performs the standard task of checking email — i.e. a task that is familiar, secure, and, for the most part, reliable. Once an Update Message arrives, the user simply launches or opens the attachment (again, in a way they are most familiar with) and the Mobile Update Agent processes the changes automatically.

The Mobile Update Server according to the present invention preferably runs as a service under Windows NT 4.0 (Workstation or Server) and can run across virtually any network operating system that supports Windows NT. However, it should be noted that the server according to the present is alternatively implemented so as to run under any operating system, for example UNIX. The server according to the present invention requires its own mail client (account) that is capable of sending and receiving email messages through the corporate mail server. The server uses the mail client to receive and process email-based subscription changes and requests automatically generated by clients when they are in off-line mode (i.e., not connected to the network). It also uses the mail client to create and send notification and update requests to its users. In addition, the server requires a network account with access rights that encompass those of its users, i.e. it should at least share the same profile as its users. This allows the server to access network files on the user's behalf to check for changes.

When installing the server, the administrator specifies where client install files should be located on the network for easy install access by users. Once the server is set up, the user installs the client from the network drive. Each client is registered with the server and writes its user name, email address, etc., to the server's database. The client can now subscribe to any network-based files located on a shared directory.

Symantec Mobile Update (SMU) according to the present invention is the first solution in the document delivery or "push" category in which currently existing data like reports, spreadsheets, presentations, etc., are delivered to the desk-top 'intelligently'. It does this by watching the network files of folders for changes, delivering "just the changes" or notifies of changes, uses one familiar and reliable connection to deliver those changes (email), and provides seamless functionality, thereby leveraging the way users currently work (in email).

Document push, like software push, is only compelling if it can deliver clear value to end-users and corporate IS. Mobile Update according to the present invention offers two tiers of benefits to corporations. For the mobile user, it receives updates anywhere, anytime (location-independent), it stays up-to-date on changes to key documents, it reduces download time for email attachments, and it reduces the hassle of accessing changes to key documents. For MIS personnel, it easily and effectively keeps mobile employees connected to corporate, LAN-based files, it reduces the length of connection times (quicker email downloads), it reduces the number of connections made (leverages email connection), and it reduce the size of email attachments (delta technology).

Although the present invention has been described with respect to its preferred embodiment, that embodiment is offered by way of example, not by way of limitation. It is to be understood that various additions and modifications can be made without departing from the spirit and scope of the present invention. Accordingly, all such additions and modifications are deemed to lie with the spirit and scope of the present invention as set out in the appended claims.

What is claimed is:

1. A method for a server computer for providing a file update for a client file on a client computer, wherein the client file was copied from a server file in communication with the server computer, the method comprising the steps of:

generating a server file digital signature indicative of the content of the server file;

comparing the server file digital signature to client file information that comprises a client file digital signature indicative of the content of the client file, the client file information accessible to the server computer, to determine if the server file has changed since the client file was copied;

if the server file has changed, identifying a variation in the content of the server file from the content of client file;

if the server file has changed, creating a file update for the client file, wherein the file update comprises the variation of the content of the server file without including unchanged portions of the server file; and if the server file has changed, communicating the file update as an email attachment to an electronic mail box accessible by the client computer;

wherein the steps of comparing, identifying, creating, and communicating are initiated and performed by The server computer without user intervention and without interaction with the client computer, and wherein the email attachment will cause the client file to be updated in response to the client computer accessing the electronic mail box and launching the email attachment.

2. The method of claim 1, wherein:

the steps of comparing identifying, creating, and communicating are repeated after a predetermined time interval.

3. The method of claim 1, further including the steps of:

if the server file has changed, creating server file information from the server file; and if the server file has changed, replacing the client file information with the server file information.

4. An article of manufacture including an information storage medium wherein is stored information, the information comprising:

a group of processor readable instructions adapted to operate on a processing device, wherein the group of processor readable instructions are adapted to operate the processing device according to a method comprising:

generating a server file digital signature indicative of the content of the server file;

comparing the server file digital signature to client file information that comprises a client file digital signature indicative of the content of the client file, the client file information accessible to the server computer, to determine if the server file has changed since the client file was copied;

if the server file has changed identifying a variation in the content of the server file from the content of client file;

if the server file has changed, creating a file update for the client file, wherein the file update comprises the variation of the content of the server file without including unchanged portions of the server file; and if the server file has changed, communicating the file update as an email attachment to an electronic mail box accessible by the client computer;

wherein the steps of comparing, identifying, creating, and communicating are initiated and performed by the server computer without user intervention and without interaction with the client computer; and wherein the email attachment will cause the client file to be updated in response to the client computer accessing the electronic mail box and launching the email attachment.

5. The method article of manufacture of claim 4, wherein:

the steps of comparing, identifying, creating, and communicating are repeated after a predetermined time interval.

6. The article of manufacture of claim 4, wherein the group of processor readable instructions are further adapted to operate the processing device to perform the following steps:

if the server file has changed, creating server file information from the server file; and if the server file has changed, replacing the client file information with the server file information.

7. A method for a server computer for maintaining an up-to-date client file on a client computer, the method comprising the steps of:

receiving a file request from the client computer for a server file in communication with the server computer;

creating client file information from the server file;

communicating a copy of the server file to the client computer;

generating a server file digital signature indicative of the contents of the server file;

comparing the server file digital signature to the client file information, which comprises a client file digital signature indicative of the copy communicated to the client computer, to determine if the server file has changed since the client file was copied;

if the server file has changed, identifying a variation in the content of the server file from the content of client file;

if the server file has changed, creating a file update for the client file, wherein the file update comprises the variation of the content of the server file without including unchanged portions of the server file; and if the server file has changed, communicating the file update as an email attachment to an electronic mail box accessible by the client computer;

wherein the steps of comparing the server file, identifying a variation, creating a file update, and communicating the file update are initiated and performed by the server computer without user intervention and without interaction with the client computer; and wherein the email attachment will cause the client file to be updated in response to the client computer accessing the electronic mail box and launching the email attachment.

8. The method of claim 7, wherein:

the steps of comparing the server file, identifying a variation, creating a file update, and communicating the file update are repeated after a predetermined time interval.

9. A method for enabling a server computer to provide an update to a client computer, after the client computer has received a copy of a server file from the server computer, the copy of the server file received by the client computer being stored in the client computer as a client file, the method comprising the steps of:

maintaining client file information, associated with the client file at a location other than the client computer, the location being accessible to the server computer;

comparing the server file to the client file information, to determine if the server file has changed since the client computer stored the client file;

if the server file has changed, identifying a variation between the server file and the client file;

if the server file has changed, creating a file update that specifies the identified variation without including unchanged portions of the server file; and if the server file has changed, sending the file update as an email attachment to an electronic mail box accessible by the client computer;

wherein the steps of comparing, identifying, creating, and sending are initiated and performed by the server computer without access to the client computer, and without two-way communication between the server computer and client computer; and wherein the email attachment will cause the client file to be updated in response to the client computer accessing the electronic mail box and launching the email attachment.

* * * * *